UNITED STATES PATENT OFFICE.

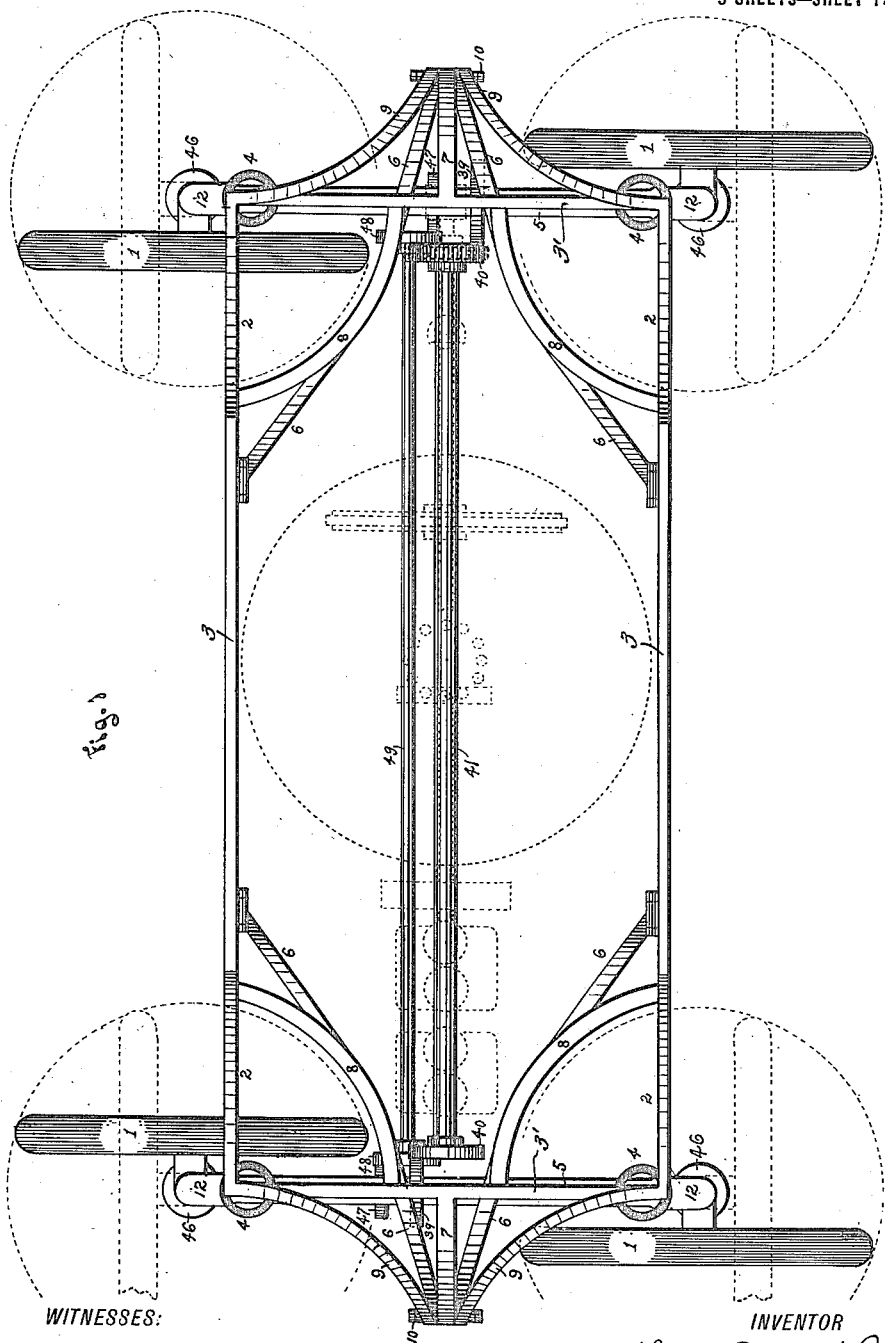

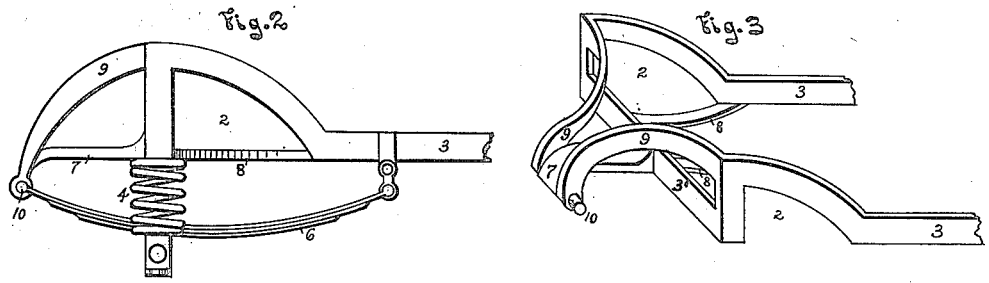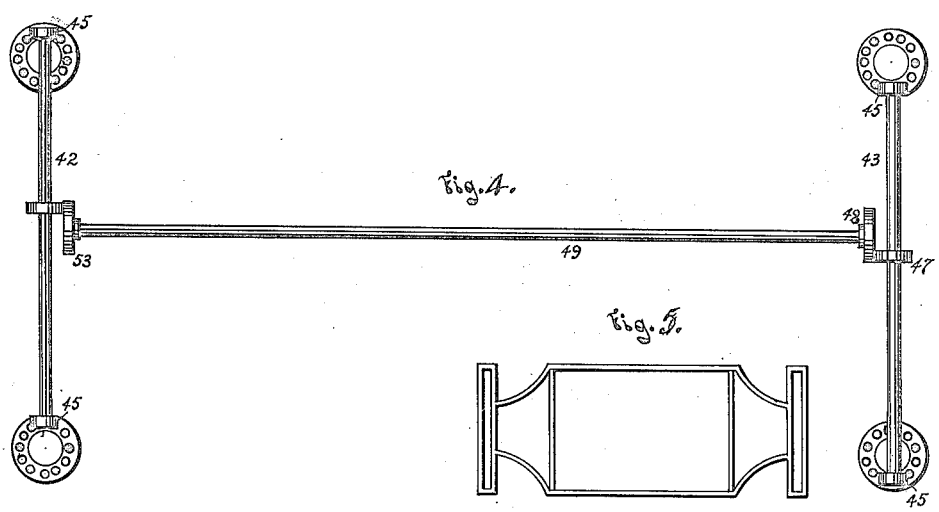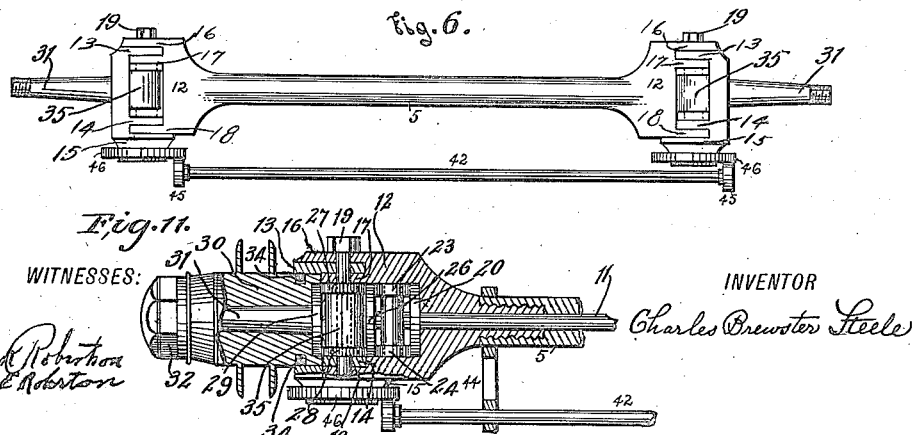

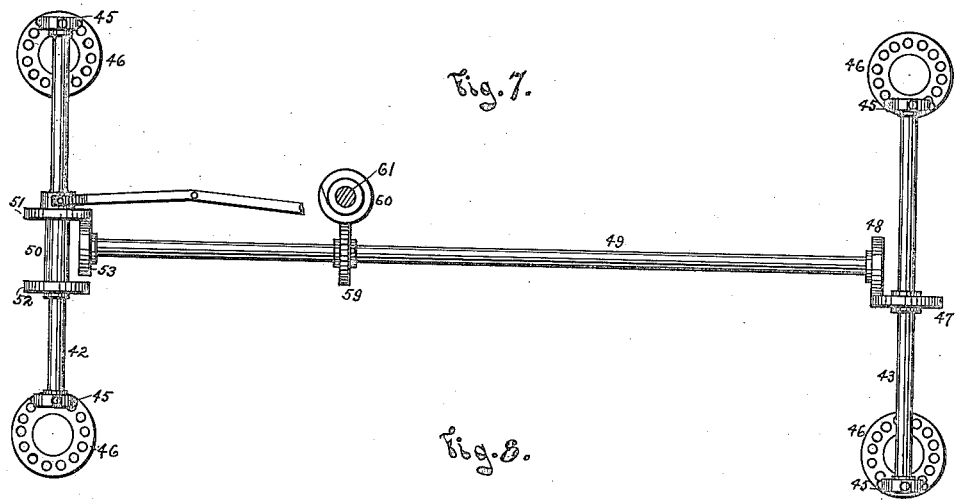
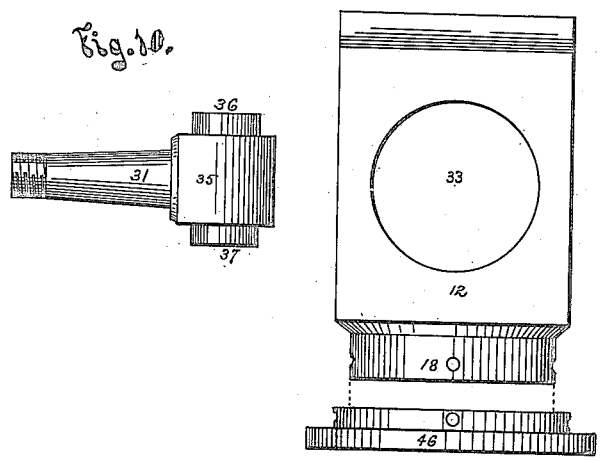
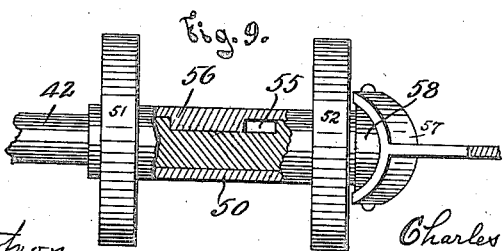

CHARLES BREWSTER STEELE, OF NEW YORK, N. Y.

MOTOR-VEHICLE.

REISSUED

1,214,968.   Specification of Letters Patent.   Patented Feb. 6, 1917.

Application filed April 18, 1907. Serial No. 368,806.

*To all whom it may concern:*

Be it known that I, CHARLES BREWSTER STEELE, a citizen of the United States, residing in the city, county, and State of New York, have invented certain new and useful Improvements in Motor-Vehicles, of which the following is a specification.

My invention is a vehicle, and consists of running-gear; frame, and steering-mechanism, that enables the supporting wheels to be turned through any angle from zero up to one hundred and eighty degrees, inclusive, in order to position the supporting wheels at right angles to the longitudinal axis of the vehicle in two positions; their intermediate position being that in which the vehicle is enabled to run straight ahead, or straight backward, all of which is hereinafter more fully described in the specification, defined in the claims, and illustrated in the drawings, in which like numerals refer to like parts in the different figures, respectively.

Figure 1 is a plan of the running-gear, frame, and steering-mechanism, in which the four supporting wheels are turned at right angles to their normal running position, illustrating the supporting wheels in one of their positions when turned at right angles.

Fig. 2, is a side elevation of one end of the frame, and showing the relation of the tie springs 6, and the cushioning, or shock absorbing springs 4.

Fig. 3, is a perspective view of one end of the frame, or chassis.

Fig. 4. is a reverse plan view of the steering-mechanism.

Fig. 5. illustrates a modified form of a frame, or chassis, provided with recesses, or wheel ports.

Fig. 6, is a side elevation of the axletree, turning knuckles, supporting wheel pintles, or stub axles, and part of the steering-mechanism.

Fig. 7, is a reverse plan view of the steering-mechanism, disclosing the shifting mechanism for the alternative steering of the vehicle.

Fig. 8, is a side elevation of the outer end of a turn-knuckle, showing the hub orifice, and the bottom ring-plate, or gear.

Fig. 9, is an elevation, partly in section, of the shifting mechanism for the alternative steering.

Fig. 10, is a side elevation of one of the supporting wheel spindles, pintles, or stub-axles.

Fig. 11, is a perpendicular section of a turn knuckle, showing the driving gears, differential gears, and a traction wheel hub, with its double bearing, and extending within the orifice of the turn-knuckle journal and mounted on the adjustable spindle, and the traction-wheel steering mechanism.

The vehicle consists of four supporting wheels, 1, rotatably secured upon the pintles, spindles, or stub-axles 31, each having an enlarged head 35, from which extend cylindrical projections, or pintles 36 and 37, and provided with a cylindrical bore 37', at right angles to the axle 31. This stub-axle 31, passes through orifice 33, of the outer half of the turn-knuckle 12, which is provided with horizontal alternate jaws, or plates, 13, 14, and 15, which intermesh with the horizontally extending alternate jaws, or plates, 16, 17, and 18, of the inner half of the turn-knuckle 12. The alternate jaws, or plates, of each half of the turn-knuckle 12, are provided with registering perforations in alinement with the bore in the head 35, through which passes the bolt 19, thereby forming a hinged connection of the pintle and wheels with the axletree 5. The hub of the wheel 1, projects within the orifice 33, which forms a bearing for the hub, so that the wheel 1, has a double support, or bearing, one the pintle 31, and the other, the turn knuckle orifice 33.

To the lower portion 18, of the outer half of the turn-knuckle 12, is rigidly secured a ring 46, provided with a gear, registering with gear 45, rigidly secured to shaft 42, upon the other end of which is secured a duplicate gear 45, which meshes with the gear 46, for swinging the spindle 31, on the opposite end of the axletree.

In Fig. 11, is shown in sectional detail the turn-knuckle operatively connected to the driving and dead axles, and the double bearing traction wheel hub mounted on the adjustable spindle and extending within the hub orifice journal, and disclosing its ball bearing. Each turn-knuckle 12, is made in two sections, and from each section extend alternate jaws, 13, 14, 15, 16, 17, and 18, which interchangeably and alternately intermesh, clasp, and fit within each other, all the jaws of one section intermeshing with and above all the jaws of the other section. Within the turn-knuckles, 12, and rigidly secured to, and at the extremities of, the live-axles, 11, is the gear wheel, 20, which engages the dual gear wheels, 23, and 24, which in turn, engage the oppositely disposed duplicate wheel, 26, which wheel, 26, gears with the wheels 27 and 28, which gear with, and drive the wheel, 29, rigidly secured to the traction wheel hub, 30, which traction wheel rotates upon and is secured to the adjustable and interchangeable spindle, 31, by the tap, 32. The outer part, or half, of a turn-knuckle, 12, is provided with the cylindrical orifice, 33, within which the traction wheel hubs fittingly extend and revolve, said hubs having ball bearings, 34, between their peripheries and said orifice. The adjustable spindle, 31, has a perforated enlargement, 35, from which project in each direction, at right angles to the axis of the spindle, enlarged pintles, 36, and 37, on which gears, 27, and 28, rotate respectively. The adjustable spindle is secured within the knuckles, and the two parts of the knuckles, are united to each other by the bolt, 19, passing through the perforated alternate jaws of each turn-knuckle, and through the perforation which extends through the pintles of the spindle. In the usual types of motor vehicles, the entire weight must be sustained by the spindles, but by my construction, though the spindle carries the traction wheel upon it, the hub being extended within the hub orifice of the turn-knuckle, its exterior surface and the knuckle orifice forms a ball bearing journal, and the traction wheel being provided with double, exterior and interior, rotating supports, the spindles, consequently, sustain only a part of the vehicle weight, and being interchangeable and adjustable, are quickly and easily removed, should occasion ever require. When the four traction wheels are driving on equal speed, the transmitting gears drive steadily with the live-axle speed, but, upon curves, where the outer traction wheels speed is increased, the dual wheels, 23, and 24, revolvingly whirl around the end of the live-axle, to which they are journaled by their wing, 38, and permit the traction wheels to differentially increase their varying speeds, the differential gears being disposed within the knuckles obviate division of the live-axles, and permit the traction wheels to assume individual speeds, while the jointless live-axles maintain the even and regular motor speed.

The four supporting wheels 1, stub-axles 31, and turn-knuckles 12, are duplicates of each other. The rotating shaft 43, located parallel and beneath the rear axletree 5, is similar in operation and function to shaft 42. Rigidly secured to shaft 43, is a gear 47, meshing with gear 48, rigidly secured to the longitudinal shaft 49, upon which, at its opposite end, is secured the gear 53, that meshes with a gear on shaft 42, as disclosed in Fig. 4.

In Fig. 7, is illustrated the gear 59, which is rigidly secured to shaft 49, which meshes with the worm 60, fixed to the steering handle shaft 61, which is intended to be applied, as well, to shaft 49, in Fig. 4. In Fig. 7, instead of having a single gear upon the forward shaft 42, as disclosed in Fig. 4, provision is made for the alternative steering arrangement, referred to above. This consists of a sleeve 50, surrounding the shaft 42, and slidably mounted thereon, provided on its interior with a spline 56, entering groove, or slot 55, which is adapted to be reciprocated into two positions by means of the bifurcated end 57, of the lever engaging the collar 58, secured to sleeve 50, in a manner to permit rotation, within said collar 58, in order, alternatively, to bring gears 51, and 52, that are rigidly secured to opposite ends of sleeve 50, into mesh with gear 53, for a purpose disclosed in the description of the operation of this machine.

In Fig. 1, is disclosed a motor, A, provided with a horizontally disposed drive-wheel, B, adapted to drive the gear wheel, C, mounted on the longitudinal driving shaft, 41, upon each end of which driving shaft, 41, are secured the gears, 40, 40, that engage with the gears 39, 39, which are secured to the live-axles, 11, that pass through the dead-axletrees, 5, that, sequentially, are secured to the turn-knuckles, all thus operatively transmitting power from the motor, A, to drive the traction wheels, the drive wheel B having its diameter, approximately, the width of the body of the vehicle, and the width of the vehicle body being capable of extension to the limit of, or even beyond, the "gage" of the vehicle, enables the diameter of the motor drive wheel, B, to be so greatly enlarged that the motor will deliver more power with an expenditure of less "horsepower", and if the motor drive wheel, B, is combined and utilized as a "gear", the multiplication of speed range, and "gear raising," would, practically only be limited by the possibility of constructing a vehicle able to sustain the strain and wear and tear of such almost limitless and prohibitive high speed resulting thereby, the drive wheel, B, also, providing gyroscopic steadiness and equilibrium, the increase in body width area of my vehicle affording a better distribution of weight, and more passenger room, while the provision, also, for the suspension of the body of my vehicle nearer to the roadway and center of gravity, reduces the danger of "upsetting" to a minimum.

The frame, or chassis consists of two, substantially, parallel side beams 3, extending upwardly, longitudinally, and downwardly, at each end, forming ports, or recesses 2, for the reception of the supporting wheels 1, when turned at right angles to their normal running position. The downward projecting parts of the frame, are connected by end beams 3'. Rigid braces 8, are attached to the side-beams 3, and being bowed inwardly around the wheel ports 2, are secured at their opposite ends to the end beams 3'. Secured to the upwardly and longitudinally extending portion of the frame, are braces 9, curved inwardly and downwardly, and attached at their opposite ends to a rigid projecting arm 7, by a strong bolt, or rod 10.

At each end of the axletrees 5, near the turn-knuckles 12, are secured springs, cushioning devices, or shock absorbers 4, upon which rest the ends of the end beams 3', secured thereto. Rigidly secured to the axletrees 5, are semi-elliptical leaf springs 6, the outward ends of which are attached to the projecting arm 7, and the inward ends of which are secured to the side beams 3. These springs bow downwardly, and are bowed inwardly, in a lateral direction, similarly to the braces 8, in order to permit the supporting wheels 1, to enter the wheel ports 2, when turned at right angles to the longitudinal axis of the vehicle. These springs 6, also perform the function of flexible strut-rods, to prevent the overreaching of the frame, or chassis, as well, as the ordinary function of a supporting spring, which would also, be accomplished were the outward portion of the springs, extending from the axletree 5, to brace arm 7, dispensed with.

The location of the supporting and cushioning springs 4, at the outward ends of the end-beams 3', not only prevents careening and swaying, but the liability of the vehicle capsizing when being propelled at high speed, or when turning corners, and by placing these shock absorbers at the corners of the vehicle, above and near the supporting wheel hubs, and the axletree extremities, shock vibrations are absorbed, and reduced to a minimum.

The normal positions of the supporting wheels, when the vehicle is running straight ahead, is disclosed in the dotted lines, in Fig. 1. By rotating longitudinal steering shaft 49, shafts 42, and 43, are rotated in opposite directions, causing the gears 46, attached to the outer half of the turn-knuckles 12, to rotate, thereby swinging the front supporting wheels 1, to be swung either to the right, or the left of their normal straight ahead position, and the rear supporting wheels 1, to be swung in the opposite direction, the consequence of which is that, if the vehicle be moved, either by its own motor, causing the supporting wheels 1, to turn, or by some extraneous force, the rear supporting wheels will follow in the track of the front supporting wheels. When the right forward supporting wheel is swung toward the right hand, the left forward supporting wheel is swung in the same direction through equal angles, while the rear supporting wheels are swung in the opposite direction through the same angles. The wheel ports 2, permit the supporting wheels to be swung through an arc of ninety degrees either to the right, or to the left, of their normal position, allowing, in all, a swing through an arc of one hundred and eighty degrees, or one half of a circle. When the forward supporting wheels are swung to the right ninety degrees from their normal position, the right forward supporting wheel will be positioned within the wheel port 2, at the rear, and parallel with the front axletree, and the left forward supporting wheel will be positioned in front of, and parallel with the front axletree, while the rear supporting wheels will occupy opposite positions, as disclosed in Fig. 1. When the forward supporting wheels are swung to the left, the right forward supporting wheel when turned at ninety degrees from its normal position, will be parallel with the front axletree, but positioned in front of the axletree, and the left forward supporting wheel will be positioned in the rear of the front axletree. The position of the rear supporting wheels will then be on opposite sides of, and parallel with the rear axletree, from that disclosed in Fig. 1.

By gradually swinging the supporting wheels in the same direction, either to the right, or to the left, when the vehicle is moving, would cause their track to take the form of a spiral, each convolution gradually decreasing in diameter, until the supporting wheels have been swung to an angle of ninety degrees with their normal straight ahead position, when the track of the supporting wheels would become a perfect circle, whose center was the center of the spiral, and there the vehicle would be positioned, continuing to move around and around its own center, and as it were, "spin like a top."

In consequence of this, it will be seen that this vehicle is enabled to turn around in a narrow street, whose width, from curb to curb, is, approximately, the length of the vehicle wheel-base, without the usual backing, and tacking, necessary with all other types of vehicles.

The operation of the steering mechanism disclosed in Fig. 7, when in the position therein, illustrated, is precisely the same, in its movement, as that just described. When shaft 49, is rotated, shaft 42, located at the front of the vehicle, will swing the supporting wheels, by transmitting motion to gears 46, which are fixed to the lower portion of the turn knuckles 12, and, likewise, the rear shaft 43, will be turned in the opposite direction, causing the rear supporting wheels to be swung in a direction opposite to that of the front, but, when the sleeve 50, carrying gears 51 and 52, is reciprocated on shaft 42, by the lever, whose structure, in detail, is disclosed in Fig. 9, to bring gear 52, in mesh with gear 53, both the front and the rear wheels will be simultaneously swung in the same direction. The consequence of this is, that when the right forward supporting wheel is swung to the right hand ninety degrees from its normal straight ahead position, it will be parallel, and in the rear of the front axletree, and the right rear supporting wheel will, also, be in rear of, and parallel with the rear axletree, while the left supporting wheels will be positioned on the opposite sides, and parallel with their respective axletrees.

Were the vehicle to be moved by applying extraneous force, when the supporting wheels are at right angles to their normal position, it would not matter whether both the right supporting wheels were on the same, or on opposite sides of their respective axletrees, the vehicle would be translated sidewise, at right angles to its longitudinal axis, but, since all four supporting wheels are made power operated traction wheels, for the propulsion of the vehicle, when in their straight ahead position, they are caused to be positively rotated in the same direction. When the steering mechanism is in ordinary normal operating position for guiding and turning the vehicle, to the right, or to the left, if the supporting wheels were swung at right angles, to their straight ahead position, since the supporting wheels continue to rotate in the same direction, the vehicle would be only turned around and around, but, if the rear supporting wheels were swung in the same direction as the front supporting wheels, either to the right, or to the left, in their angle right positions, as is the case when the alternative steering shifting mechanism occupies its second position, the vehicle would move at right angles, either to the right, or to the left, of its longitudinal axis, according to whether the supporting wheels had been swung to the right, or to the left. This alternative method of steering enables the translation of the vehicle in any and every direction from the center of its own axis, upon any arc of any diagonal, straight ahead, rearward, and sidewise angles. Should the vehicle be caught in a traffic "block", impossible to proceed, frontward or rearward, the vehicle can be translated directly sidewise into an intervening street, the supporting wheels again swung to normal position, by means of the shifting alternative steering gear, and the vehicle proceed on its, thus only slightly interrupted, journey.

This vehicle, by means of its peculiar construction and arrangement, has a four wheel "drive" equally distributing and applying the power to "pull" as well as "push" the vehicle, thus enabling it to climb steep grades with greater ease and facility, and to travel on level roadways, with a minimum expenditure of power. It has, also, a four wheel "steer" by which the rear traction wheels must always "track" with the front traction wheels, so that the chauffeur need only consider the avoidance of obstructions on the roadway by the front traction wheels, as all obstructions avoided by the front traction wheels must, consequently, be avoided by the rear traction wheels, and in guiding the vehicle, as both the front and rear traction wheels simultaneously swing and turn equal distances, each pair of traction wheels steeringly move only half the distance required by other vehicles that are steered by the front wheels alone, so that my vehicle will smoothly glide around curves and corners without the danger of "skidding" common to other types of vehicles, and without straining and taxing the stability of the vehicle. It will steer and guide in any direction on any angle of the entire circle of angles up to three hundred and sixty degrees, can be turned around on a narrow roadway within the distance of its own length, in contrast to the necessary "backing" and "filling" of other vehicles, its strong construction, comparative few parts, practical simplicity, and ease of operation, control, and management, constituting my vehicle a most proficient and dependable automobile for all occasions and purposes.

What I claim as new, and desire to secure by Letters Patent, is:—

1. In a motor vehicle, a frame provided with end beams, connected with side beams, substantially at right angles with the side beams, said side beams being bowed upward at each end near their union with the end beams, an extension at each end of the frame from the center of each end beam, the outer end of the extension being curved downwardly, braces connecting each corner of the frame with the outer end of the extension, said braces being curved and adapted to admit of the wheels passing beneath them.

2. In a vehicle, a running gear composed of the following elements, front and rear axles, a frame consisting of side beams having bowed extensions to form wheel ports, and end beams suitably connected with the bowed extensions connecting the axles, turn knuckles on the extremities of said axles, wheels upon said turn knuckles, a steering handle, connecting mechanism between the turn knuckles and the steering handle, said frame being provided with recesses, the general arrangement being such that the wheels may be placed at right angles to the axis of the vehicle in two positions, namely, both in front of and at the rear of said axles, springs connecting the bowed extensions of the end beams with the side beams, said springs being bowed downwardly and also inwardly.

3. In a vehicle, a running gear, composed of the following elements, front and rear axles, a frame consisting of side beams having bowed extensions to form wheel ports, and end beams suitably connected with the bowed extensions connecting the axles, turn knuckles on the extremities of said axles, wheels upon said turn knuckles, a steering handle, connecting mechanism between the turn knuckles and the steering handle, said frame being provided with recesses, the general arrangement being such that the wheels may be placed at right angles to the axis of the vehicle in two positions, namely, both in front of and at the rear of said axles, leaf springs connecting the outward bowed extensions of the end beams with the side beams, the form of the springs being bowed downwardly in a direction at right angles with the plane of the leaves, and inwardly in a direction parallel with the leaves.

4. In a vehicle, front and rear and side beams forming substantially an oblong rectangular frame, the side beams being bowed upwardly at both ends of the side beams, perpendicular posts connecting the top extremities of the bows on the side beams with the end beams, downwardly bowed and curved extensions connecting said posts with the end beams, braces connecting the end beams with the side beams, said braces being curved to permit the traction wheels to turn at right angles to the axis of the side beams.

5. In a vehicle, a frame of substantially an oblong rectangle, the longer sides of the frame being provided with recesses adapted to receive the rim of the wheels, projections extending outwardly from the center of the short sides of the frame, springs connecting the ends of said projections with the long sides of the frame, said springs being bowed downwardly and inwardly in order to accommodate the rims of the wheels.

6. In a vehicle, a running-gear provided with axles near both ends thereof, a frame connecting the axles, turn-knuckles on the extremities of the axles traction wheels connected to the turn-knuckles, steering means, connecting mechanism between the steering means and the turn-knuckles, and shock absorbers located near the extremities of the axle supporting the frame upon the axles.

7. A vehicle provided with pintles hingedly secured thereto, wheels rotatable upon said pintles, a frame for the vehicle provided with recesses adapted to permit the wheels to be swung upon their pintles into and out of said recesses at right angles with the axis of the vehicle.

8. A vehicle provided with four supporting wheels hingedly secured thereto adapted to be swung through one hundred and eighty degrees, a frame provided with recesses adapted to permit the wheels to be swung at right angles to the longitudinal axis of the vehicle into said recesses, both in front and in the rear of the hinged supports of the wheels.

9. A vehicle provided with four supporting wheels hingedly secured thereto, a frame consisting of side bars extending upwardly and longitudinally of the bars at each end of the bars, then extending downwardly toward the hinged wheel supports, and provided with means for spacing the side bars from each other so that the wheels may be hingedly swung both in front and in rear of the downward projections of the frame.

10. A vehicle provided with front and rear axletrees, pintles hingedly secured at the ends of the axletrees, wheels rotatably secured to the pintles, a frame provided with ports or recesses and supported by said axletrees adapted to permit the wheels to swing thereinto both in front and in rear of the axletrees at right angles with the longitudinal axis of the vehicle.

11. A vehicle provided with supporting wheels hingedly secured thereto and adapted to swing through an angle of one hundred and eighty degrees, said vehicle having ports adapted to permit the wheels to be swung thereinto at right angles to the axis of the vehicle.

12. A vehicle provided with pintles hingedly connected thereto, wheels rotatably mounted upon said pintles, said vehicle being provided with recesses adapted to receive the wheels when swung at right angles to the axis of the vehicle.

13. A vehicle provided with four supporting wheels, pintles hingedly secured on each side of the vehicle at the front and at the rear thereof upon which said wheels are rotatably mounted, said vehicle being provided with recesses adapted to permit both the front and the rear wheels to be swung thereinto at right angles with the longitudinal axis of the vehicle, and operating mechanism connected with the pintles for simultaneously swinging said pintles.

14. A vehicle provided with an axletree, a frame provided with an end beam secured in parallel to the axletree substantially the length thereof and side beams substantially at right angles with said end beam a portion of said side beams being out of the normal beam lines to form ports or recesses adapted to accommodate the supporting wheels.

15. A vehicle provided with an axletree, a frame consisting of parallel longitudinal side beams bowed upwardly and over said axletree, the ends of said bowed extensions being provided with downwardly extending projections and connected to each other by a rigid beam, said frame being provided with extensions bowed inwardly and downwardly and rigidly connected to each other, said horizontal beams each being connected to the transverse beam over said axletree by inwardly bowed braces, springs connected to said axletree intermediate their ends, one end of each spring being connected to its respective side beam and the other end of the springs being connected to the outwardly and downwardly extending projections.

16. A vehicle having an axletree, a frame consisting of side beams bowed upwardly at their ends over the axletree and having downwardly projecting posts over the axletree united to the bowed ends of the frame, a transverse end beam united to each post, braces bowed inwardly connecting each side beam with the end beam, an outwardly extending beam connected to the end beam, braces bowed inwardly and downwardly connecting the bows of the side beams with the outwardly extending beam, springs connecting the side beams with the extension beam and fixed to the axletree, and springs between the end beam and the axletree.

17. A vehicle provided with supporting wheels hingedly secured thereto at the sides thereof capable of being swung through an angle of one hundred and eighty degrees, said vehicle being provided with ports or recesses adapted to receive the wheels.

18. A vehicle provided with an axletree, a frame extending over said axletree, springs interposed between said frame and said axletree, said frame being provided with an extension, a tie connected to said extension and the main body portion of said frame and secured intermediate its connecting ends to said axletree.

19. A vehicle provided with an axletree, a frame extending over said axletree, springs interposed between said frame and said axletree, said frame being provided with ports or recesses adapted to receive supporting wheels, wheels hingedly secured to the ends of said axletree and adapted to be swung into said ports, a flat metal spring secured to said axletree and being curved edgewise and connected to the frame.

20. A vehicle provided with an axletree, a frame provided with ports adapted to receive supporting wheels when swung thereinto, said frame having an end beam, an axletree horizontally disposed below said beam and having supporting wheels hingedly secured thereto adapted to be swung at right angles into said ports, springs interposed between the ends of said end beam and said axletree.

21. A vehicle provided with an axletree, a frame having side beams, and an end beam parallel to the axletree and spaced therefrom, said end beam being united to the side beams by a portion extending upwardly and then downwardly to provide ports or recesses for the reception of the supporting wheels, springs interposed between said end beam and axletree.

22. A vehicle provided with an axletree, a frame provided with side beams the ends of which extend in an upward and longitudinal and downward direction over said axletree, thereby forming wheel ports, said frame being rigidly connected at the ends and secured to the axletree.

23. A vehicle provided with an axletree, a frame having side beams the ends of which extend upwardly longitudinally and downwardly over said axletree to form wheel ports, an end beam connecting the downwardly extending portions of the frame, braces united to the end beam curved inwardly and connected with the side beams, braces connected to the upwardly and longitudinally extended portions of the side beams and rigidly connected to the end of the frame.

24. A vehicle provided with an axletree, a frame having side beams the ends of which extend upwardly longitudinally and downwardly over said axletree to form wheel ports, an end beam connecting the downwardly extending portions of the frame, braces tied to the end beam and each side beam.

25. A vehicle frame consisting of end beams and side beams the side beams being provided with vertical bows near the end beams to provide wheel ports and braces bowed inwardly connecting the side beams with an end beam.

26. A vehicle frame consisting of end beams and side beams the side beams being provided with braces extending from the side beams to the end beams, the side beams being bent out of their normal alinement at each end thereof to form wheel ports.

27. A vehicle having a body portion frame provided with end beams and side beams, axles, traction wheels mounted upon the axles adapted to propel and guide the vehicle, and springs interposed between the axles and the body portion frame secured respectively to the axles, and the end beams, and the side beams of the body portion.

28. A vehicle having a body portion provided with traction wheel ports, traction wheels secured to the body portion adapted to propel and guide the vehicle and swing into the wheel ports, and braces adapted to strengthen the body portion adjacent the wheel ports.

29. A motor vehicle having a body portion provided with ports for receiving the traction wheels, traction wheels pivotally secured to and supporting the body portion, a motor, means to transmit power to the traction wheels, means to permit the traction wheels to turn to right angles with the longitudinal axis of the vehicle, means to steer the traction wheels to right angles with the longitudinal axis of the vehicle, and means to simultaneously drive all of the traction wheels to propel the vehicle.

30. A vehicle having a body portion, hingedly secured rotatable traction wheels supporting the body portion, means to permit the traction wheels to be swung to right angles with the longitudinal axis of the vehicle, means to steer the traction wheels to right angles with the longitudinal axis of the vehicle, and means to alternatively shift the steering means to steer the traction wheels and guide the vehicle upon any angle up to three hundred and sixty degrees.

31. A vehicle having a body portion, hinge-joints secured to the body portion, spindles on the hinge-joints, an orifice in the hinge-joints permitting the passage of the spindles and forming a bearing for traction-wheel hubs, traction wheels mounted on the spindles the hubs of the traction-wheels extending within the orifice thereby providing a double bearing for the traction-wheels.

32. A vehicle having a body portion provided with hinge-joints, rotatable traction-wheels connected to the hinge-joints, means to turn the traction-wheels and steer the vehicle, the width of the body portion extending to the line of the vertical plane of the hinge-joints.

33. A vehicle having a body portion provided with hinge-joints, rotatable traction-wheels connected to the hinge-joints, means to turn the traction wheels and steer the vehicle, the width of the body portion extending beyond the line of the vertical plane of the traction-wheels.

34. A motor vehicle having a body portion provided with hinge-joints, rotatable traction-wheels connected to the hinge-joints, means to permit the traction-wheels to turn and guide the vehicle, means to steer the traction-wheels, means to extend the width of the body portion to the line of the vertical plane of the hinge joints, and a motor to propel the vehicle provided with a drive wheel whose diameter measures approximately the width of the body portion.

35. A motor vehicle having a body portion provided with hinge-joints, rotatable traction-wheels connected to the hinge-joints, means to permit the traction-wheels to turn and guide the vehicle, means to steer the traction-wheels, means to extend the width of the body portion beyond the line of the vertical plane of the traction-wheels, and a motor to propel the vehicle provided with a drive wheel whose diameter measures approximately the width of the body portion.

36. A vehicle having a body portion, hinge-joints secured to the body portion, spindles on the hinge-joints, traction-wheels mounted on the spindles, and an orifice in the hinge-joints permitting the passage of the spindles by which the traction-wheels oscillate the spindles.

37. A vehicle having a body portion, hinge-joints secured to the body portion provided with members each having a plurality of alternate jaws, traction-wheels secured to a hinge-joint member, all the jaws of a member intermeshing with and above all the jaws of another member.

38. A vehicle running gear provided with supporting wheels at both ends of the vehicle, a body portion frame having end beams and side beams, said body portion frame being provided with ports to permit the traction wheels to be swung thereinto, the body portion frame intermediate the wheel ports being adapted to hang below the level of the wheel centers.

39. A vehicle running gear provided with supporting wheels at both ends of the vehicle, a body portion frame having end beams and side beams, said body portion frame being provided with ports to permit the traction wheels to be swung thereinto, the body portion frame intermediate the wheel ports being adapted to hang below the level of the wheel hubs.

In testimony whereof I hereby affix my signature in presence of two witnesses.

CHARLES BREWSTER STEELE.

Witnesses:
MOSES G. SMITH,
WILLIAM H. HOWLIN.